(12) United States Patent
Lundgren

(10) Patent No.: US 7,520,055 B2
(45) Date of Patent: Apr. 21, 2009

(54) METHOD FOR MANUFACTURING A STATOR OR ROTOR COMPONENT

(75) Inventor: Jan Lundgren, Grundsund (SE)

(73) Assignee: Volvo Aero Corporation, Trollhattan (SE)

( * ) Notice: Subject to any disclaimer, the term of this patent is extended or adjusted under 35 U.S.C. 154(b) by 274 days.

(21) Appl. No.: 10/708,391

(22) Filed: Feb. 27, 2004

(65) Prior Publication Data

US 2004/0158984 A1 Aug. 19, 2004

Related U.S. Application Data

(63) Continuation of application No. PCT/SE02/01453, filed on Aug. 14, 2002, now abandoned.

(30) Foreign Application Priority Data

Aug. 29, 2001 (SE) .................................. 0102883

(51) Int. Cl.
*B21K 25/00* (2006.01)
(52) U.S. Cl. .................................. 29/889.22
(58) Field of Classification Search ................. 29/889.2, 29/889.21, 889.22, 889.23, 889.72, 525.14, 29/525.13
See application file for complete search history.

(56) References Cited

U.S. PATENT DOCUMENTS

| 1,641,745 | A | * | 9/1927 | Dimberg | ..................... 228/254 |
| 1,833,754 | A | * | 11/1931 | Paget | ........................ 416/215 |
| 2,347,034 | A | * | 4/1944 | Doran | ........................ 416/191 |
| 4,445,259 | A | | 5/1984 | Ekbom | |
| 4,575,911 | A | | 3/1986 | Laszlo | |
| 4,812,107 | A | | 3/1989 | Barcella et al. | |
| 4,868,365 | A | * | 9/1989 | Farone et al. | .......... 219/121.64 |
| 5,483,034 | A | * | 1/1996 | Havard et al. | .......... 219/121.64 |
| 6,591,499 | B1 | * | 7/2003 | Lundgren | ................. 29/890.01 |
| 2001/0003226 | A1 | | 6/2001 | Schreiber et al. | |

FOREIGN PATENT DOCUMENTS

| DE | 19858702 A1 | 6/2000 |
| DE | 19922012 C1 | 10/2000 |
| GB | 2274418 A | 7/1994 |
| WO | WO 00/20749 | * 4/2000 |

OTHER PUBLICATIONS

Patent Abstracts of Japan, filed Nov. 8, 1983, vol. 007, No. 250 (M254).

* cited by examiner

*Primary Examiner*—John C Hong
(74) *Attorney, Agent, or Firm*—Novak Druce + Quigg LLP

(57) ABSTRACT

A method for manufacturing a stator or rotor component (8) for a gas turbine in which at least one wall element (3) is joined together with at least one ring element (9). The edges of the wall element (3) are laser-welded firmly on the ring element (9) from an opposite side, in the radial direction, of the ring element in relation to the wall element in such a way that the joined-together portions of the wall element and the ring element form a T-shaped joint.

15 Claims, 3 Drawing Sheets

METHOD FOR MANUFACTURING A STATOR OR ROTOR COMPONENT

CROSS REFERENCE TO RELATED APPLICATIONS

The present application is a continuation patent application of International Application No. PCT/SE02/01453 filed 14 Aug. 2002 which was published in English pursuant to Article 21(2) of the Patent Cooperation Treaty, and which claims priority to Swedish Application No. 0102883-6 filed 29 Aug. 2001. Both applications are expressly incorporated herein by reference in their entireties.

BACKGROUND OF INVENTION

1. Field of the Invention

The present invention relates to a method for manufacturing a stator or rotor component having at least one wall element for guiding a gas flow and/or transmitting load and which is joined together with at least one ring element. The stator or rotor component can be used in, for example, a gas turbine and in particular in a jet engine.

The term jet engine includes various types of engines which take in air at relatively low speed, heat it by combustion, and discharge the air at much higher speed. The term jet engine includes, for example, turbo-jet engines and turbo-fan engines.

The component can therefore be used for both static and rotary applications. In the former case, such a component which comprises (includes, but is not limited to) an outer ring and an inner ring with the wall elements arranged between the rings, can be arranged for the purpose of transmitting force in the radial direction. The wall elements can, for example, form hollow blades, which usually have such a shape that they offer as little air resistance as possible. The component can, for example, be arranged in a rear or front support in a jet engine. In such a case, the blades are often referred to as struts. However, struts can also be formed by parts other than hollow blades. In rotors, the component can be used as a fan for the purpose of guiding or deflecting a flow, for example in a jet engine.

When hollow, the blades are of so configured for the purpose of optimizing the weight of the component.

2. Background Art

It is known to join together wall elements of a stator or rotor component, usually in the form of a hollow blade, together with a ring element by welding. The ring element is then manufactured first with portions projecting in the radial direction with the same cross-sectional shape and size as the blades. Such projecting portions are often referred to as "stubs." Each of the blades is then welded firmly to such a projecting portion by means of a butt joint. The portions projecting in the radial direction are usually milled from a ring. This is a time-consuming and costly operation.

SUMMARY OF INVENTION

One object of the present invention is to produce a method for manufacturing a stator or rotor component which, in comparison to know designs, allows simplified, and thus time-efficient and cost-effective manufacture. Furthermore, the method provides a high-strength connection between the wall element and ring element thereby giving the component a long life.

This object is achieved by virtue of the edge of the wall element being laser-welded firmly on the ring element from an opposite side, in the radial direction, of the ring element in relation to the wall element and in such a way that the joined-together portions of the wall element and the ring element form a T-shaped joint. In the present context, the edge of the wall element should be taken to mean the elongate surface that delimits the side surfaces of the wall element. Suitable selection of material parameters and welding parameters makes it possible to obtain a T-shaped joint with rounded corners, or at least a relatively smooth transition between the wall and the ring element. This results in a high-strength construction and thus, extended life. Alternatively, a construction with thinner wall thicknesses, and thus reduced weight, can be achieved.

According to a preferred embodiment of the invention, a plurality of the wall elements are joined together with the ring element at a mutual spacing in its peripheral direction. The ring element can, for example, form a continuous ring in the peripheral direction. In this connection, it is possible to form, for example, a fan wheel, a turbine, a compressor or a stator part.

Further preferred embodiments and advantages of the invention emerge from the claims and the following description.

BRIEF DESCRIPTION OF DRAWINGS

The invention will be described in greater detail below with reference to the embodiments which are shown in the accompanying drawings, in which.

DETAILED DESCRIPTION

Figure 1:
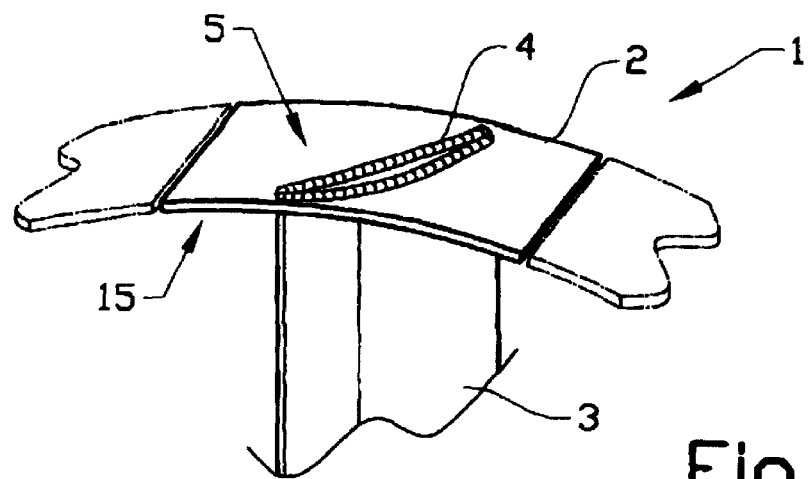
FIG. 1 is a partial perspective view showing a part of a stator or rotor component configured according to a first embodiment of the present invention.
Figure 2:
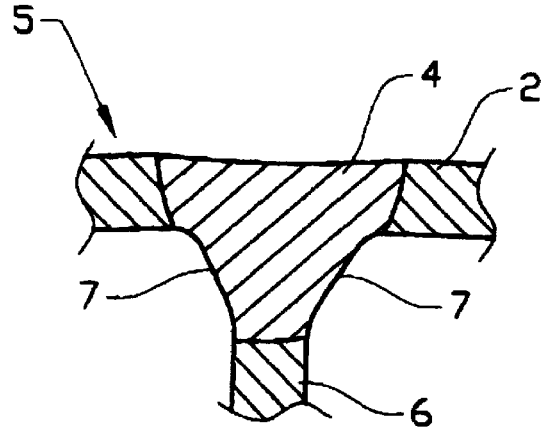
FIG. 2 is an enlarged sectional view of a welded joint in a component as depicted in FIG. 1.

FIG. 1 shows a part of a stator or rotor component 1. More specifically, a ring element 2 and a wall element 3, in which the wall element takes the form of a hollow blade, are joined together as shown. The blade 3 projects inward from the ring element 2 in the radial direction and is joined together with the ring element by means of a welded joint 4. A plurality of such ring elements 2 are intended to be interconnected in the peripheral direction in order to form an annular component or rotor component. The blade 3 is also, at its end located opposite the ring element 2, connected to a center part, for example in the form of a ring. An enlarged sectional view of the welded joint 4 is shown in FIG. 2.

When the blade 3 is joined together with the ring element 2, the blade is placed in contact with an inner surface 15 of the ring element 2. The wall edges of the blade 3 are then laser-welded firmly on the ring element 2 from an opposite side 5 thereof, in radial alignment therewith. In the present context, the wall edge of the blade means the surface which connects the inner side surface and the outer side surface of the blade. This is carried out in such a way that the joined-together portions of the wall 6 of the blade 3 and the ring element 2 form a T-shaped joint 4 as depicted in FIG. 2. In other words, the blade 3 is concealed by the ring element 2, seen from the upper surface 5 of the ring element 2, during welding.

More specifically, T-joint 4 means that a portion of the ring element 2 forms the crosspiece part of the T, and a portion of the blade wall 6 forms the upright part of the T which joins the crosspiece part.

The materials used for the blade wall 6 and the ring element 2 consist of weldable materials, such as stainless steel, for example of the type 347 or A286. Use can alternatively be made of nickel-based alloys such as, for example, INCO600, INCO625, INCO718 and Hastaloy x. According to other variants, cobalt-based alloys, for example of the type HAYNES 188 and HAYNES 230, can be used. Titanium alloys, such as Ti6-4, and various types of aluminum alloys, can also be used. Combinations of different materials are also possible.

For the laser-welding, use is preferably made of an Nd:YAG-laser, but other types of welding arrangements, for example a $CO_2^-$laser, can also be used according to the invention.

By accurate matching of the welding procedure, material selection and dimensions of blade walls and ring elements, the laser-welding produces the T-shape at the joint and also a softly rounded shape 7 on the inner corners between the blade wall 6 and the ring element 2. Welding is suitably effected by means of a continuous weld. The rounded shape 7 of the welded joints results in a high-strength construction and thus a long life of the component. This type of joining together affords opportunities for complete fusion of the welded joint and fine transitions between the parts.

In order that the welded joint comes to lie in exactly the correct position, known joint-tracking techniques can be used.

In cross section, the outer contour of the blade 3 forms the shape of an airfoil.

The ring element 2 has the shape of a slightly curved plate. Plate shape means that the ring element has two parallel side surfaces at a relatively short distance from one another. When a plurality of such ring elements are joined together in the peripheral direction, a ring is formed. In the present context, the term ring means an all-round, band-shaped, preferably circular part which extends like a plate in the axial direction.

Figure 3:
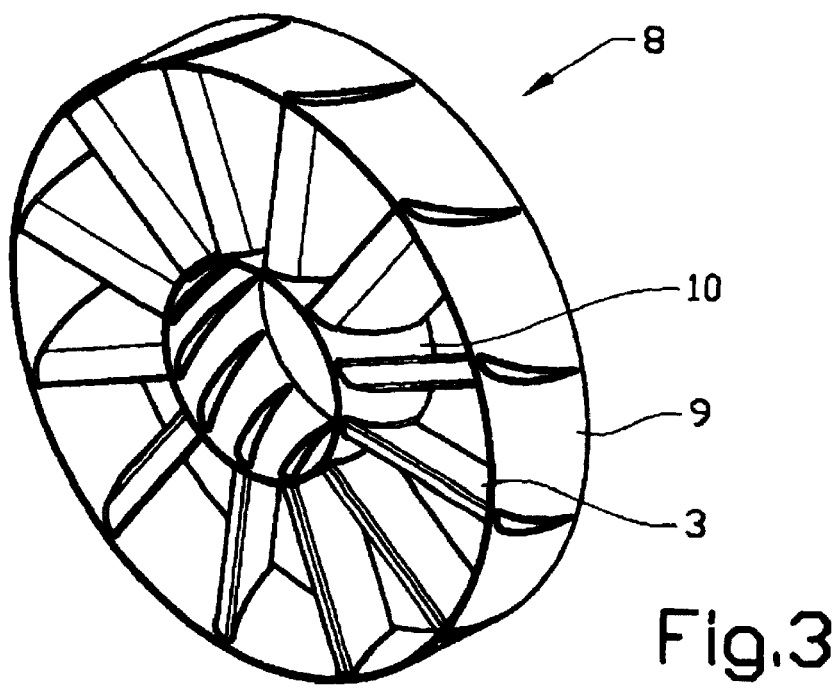
FIGS. 3, 4 and 5 are perspective views, each showing a stator or rotor component configured according to a second, third and fourth embodiment of the present invention, respectively.

FIG. 3 illustrates a second embodiment of a stator component or rotor component 8. The component 8 comprises a radially outer ring element 9 and a radially inner ring element 10. The two ring elements 9, 10 are continuous in the peripheral direction. A plurality of hollow blades 3 are arranged with a mutual spacing in the peripheral direction and extend between the two ring elements 9, 10. The blades 3 are connected to at least one of the ring elements 9, 10 by means of the welded joint described above.

Figure 4:
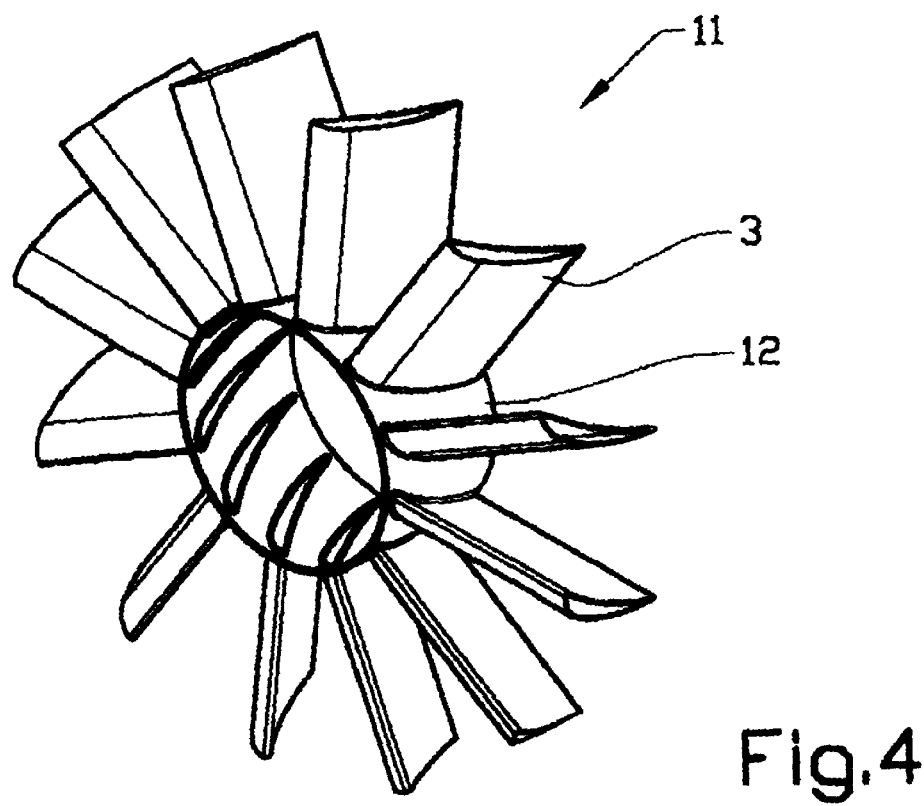

FIG. 4 illustrates a third embodiment of a stator component or rotor component 11. The component 11 comprises a ring element 12, which is continuous in the peripheral direction, with a plurality of hollow blades 3 projecting outward in the radial direction. The blades 3 are connected to the ring element 12 by means of the welded joint described above. This embodiment is suitable primarily for rotors.

Figure 5:
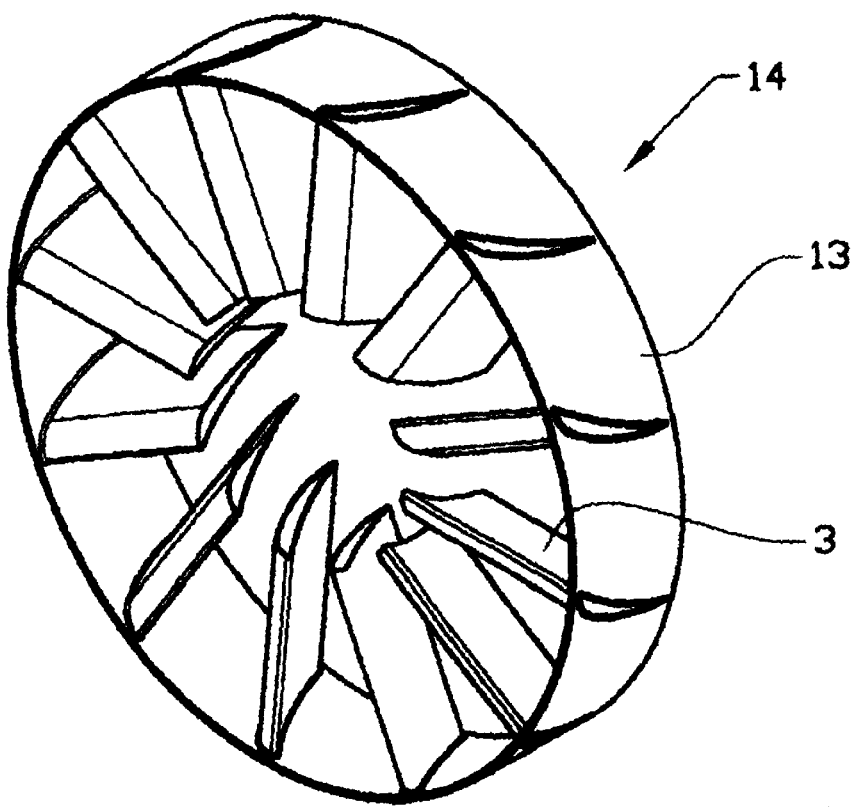

FIG. 5 illustrates a fourth embodiment of a stator component or rotor component 14. The component 14 comprises a ring element 13, which is continuous in the peripheral direction, with a plurality of hollow blades 3 projecting inward in the radial direction. The blades 3 are connected to the ring element 13 by means of a welded joint as is described above. This embodiment is suitable primarily for stators.

As an alternative to the embodiments shown in FIGS. 3-5, it is possible to form the ring by means of a plurality of ring elements in such a way as described above and shown in FIG. 1. The term ring element as used in the description above therefore means a continuous annular element, a mainly annular element which is discontinuous in the peripheral direction, or a part which, together with other similar parts, is intended to form an annular element.

Figure 6:
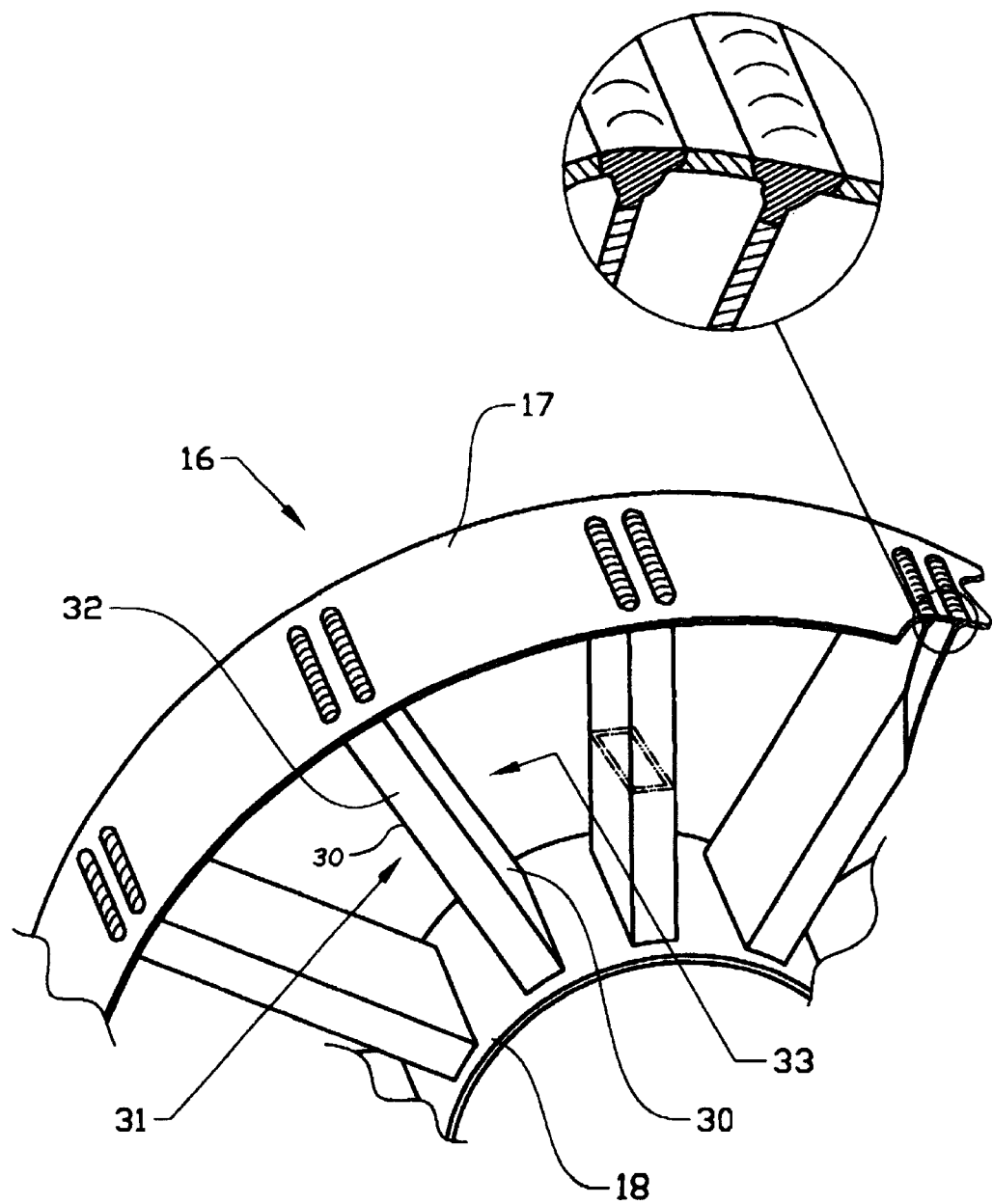
FIG. 6 is a partial perspective view showing a fifth embodiment of the stator or rotor component.

FIG. 6 illustrates a fifth embodiment of a stator or rotor component 16. Each of a plurality of wall elements 30 in the form of plates, or panels, is connected to a radially outer ring element 17 by means of laser-welding from the outside of the ring element. A weld shape corresponding to that which is described above and shown in FIG. 2 is thereby obtained. In this context, "plate shape" means that the wall element 30 has two parallel side surfaces positioned at a relatively short distance from one another.

The wall elements 30 do not, therefore, form a hollow blade before welding, but are in the form of separate plates.

If the purpose of the wall elements is to be load-transmitting or load-bearing in the radial direction, that is to say, in the case that such wall elements form what is known as struts, an aerofoil shape is not always necessary, nor is a hollow-blade form; a plate shape may be sufficient. A plurality of different configurations are nevertheless possible. In this context, plate shape includes, for example, both a wall element extending in a plane (planar shaped) and one having a rounded or curved shape.

FIG. 6 also illustrates a case in which two wall elements 30 are arranged adjacent to one another and front wall edges, in the axial direction of the component, have been connected. In this case, the gas is intended to flow in the spaces at the side of the part formed by the connected wall elements, in the peripheral direction of the component. The connection can be effected by, for example, fastening a rectangular, plate-shaped cover 32 to the front edges of the wall elements 30, 31. The connection can be made by, for example, welding. According to one alternative, the rear wall edges of the two wall elements in the axial direction are also connected by a further cover 33. The two wall elements 30 and the two covers then together form a means 31 for guiding a gas or transmitting load. In FIG. 6, this means 31 has a rectangular cross-sectional shape. The means formed by two adjacent wall elements can therefore have an all-round cross-sectional shape, which does not necessarily have to be closed. The covers 32, 33 can alternatively have a pointed shape in order to constitute less flow resistance.

According to an alternative or complement to the component shown in FIG. 6, the wall elements 30 are also connected to a radially inner ring 18 by means of laser-welding from the inside of the ring.

It should be appreciated that the invention is not to be regarded as being limited to the illustrative embodiments described above, but a plurality of further variants and modifications are within the scope of the patent claims.

For example, the hollow blades do not have to be hollow throughout, but the blades can be closed at one end. Furthermore, reinforcing elements can be arranged inside the blades. Such reinforcing elements then extend between the opposite blade walls and are connected to these.

Depending on the application, the blade described above may be referred to differently and, in addition to struts, can also be called a vane or a guide vane.

The stator component can, for example, form an intermediate housing, a turbine exhaust housing (that is to say an end housing part), or a part of this for a gas turbine. Furthermore, in the aircraft engine application, the stator component can constitute a bearing support for transmitting force via the attachments from the engine to the plane.

The invention claimed is:

1. A method for manufacturing a stator or rotor component having a plurality of airfoil-shaped, hollow, blade-type wall elements joined together with a ring member, each wall element being comprised of a plurality of blade walls, the method comprising:

laser-welding an edge of each of at least two blade walls of each wall element of the stator or rotor component firmly on the ring member of the stator or rotor component, from an opposite side of the ring element, at a position radially aligned with the blade wall;

wherein the joined-together portions of the blade walls and the ring member form T-shaped joints.

2. The method as recited in claim 1, wherein a plurality of ring elements are joined together with one another in the peripheral direction to form the ring member.

3. The method as recited in claim 1, wherein said ring member is an inner ring and the wall elements are joined together with the ring member by means of laser-welding in such a way that said wall elements project outward in the radial direction from the inner ring.

4. The method as recited in claim 1, wherein said ring member is an outer ring, and wherein the wall elements are joined together with the ring member by means of laser-welding in such a way that said wall elements project inward in the radial direction from the outer ring.

5. The method as recited in claim 1, wherein the stator or rotor component is configured for utilization in a gas turbine.

6. The method as recited in claim 1, wherein the stator or rotor component is configured for utilization in a jet engine.

7. The method as recited in claim 1, wherein an edge of each of at least two blade walls of each wall element are laser-welded in one continuous weld.

8. A method for manufacturing a stator component having a plurality of radially extending, load-bearing struts joined together with a ring member, each strut being comprised of a plurality of wall elements, the method comprising:

laser-welding an edge of each of at least two wall elements of each strut firmly on the ring member of the stator component, from an opposite side of the ring member, at a position radially aligned with the wall element;

wherein the joined-together portions of the wall elements and the ring member form T-shaped joints, and the struts transmit load in the radial direction during operation of the stator component.

9. The method as recited in claim 8, wherein a plurality of ring elements are joined together with one another in the peripheral direction to form the ring member.

10. The method as recited in claim 8, wherein said ring member is an inner ring and the wall elements are joined together with the ring member by means of laser-welding in such a way that said wall elements project outward in the radial direction from the inner ring.

11. The method as recited in claim 8, wherein said ring member is an outer ring, and wherein the wall elements are joined together with the ring member by means of laser-welding in such a way that said wall elements project inward in the radial direction from the outer ring.

12. The method as recited in claim 8, wherein at least two of said wall elements are joined together after laser-welding thereby forming means for transmitting load.

13. The method as recited in claim 8, wherein the stator component is configured for utilization in a gas turbine.

14. The method as recited in claim 8, wherein the stator component is configured for utilization in a jet engine.

15. The method as recited in claim 8, wherein at least two of said walls elements are arranged parallel to each other.

* * * * *